United States Patent
Xu et al.

(10) Patent No.: US 12,129,647 B2
(45) Date of Patent: Oct. 29, 2024

(54) LINE SET COVER

(71) Applicant: Rectorseal, LLC, Houston, TX (US)

(72) Inventors: Zhengyi Xu, Houston, TX (US); Jun Luo, Cypress, TX (US); Caitlin Krc, Houston, TX (US)

(73) Assignee: RECTORSEAL, LLC, Houston, TX (US)

( * ) Notice: Subject to any disclaimer, the term of this patent is extended or adjusted under 35 U.S.C. 154(b) by 235 days.

(21) Appl. No.: 17/896,939

(22) Filed: Aug. 26, 2022

(65) Prior Publication Data

US 2023/0144012 A1    May 11, 2023

Related U.S. Application Data

(60) Provisional application No. 63/276,270, filed on Nov. 5, 2021.

(51) Int. Cl.
*E04B 1/66* (2006.01)
*F16L 5/02* (2006.01)
*F16L 59/18* (2006.01)

(52) U.S. Cl.
CPC .............. *E04B 1/66* (2013.01); *F16L 5/02* (2013.01); *F16L 59/182* (2013.01)

(58) Field of Classification Search
CPC ..... F16L 5/00; F16L 5/02; F16L 5/025; F16L 5/10; F16L 5/027; F16L 59/182; F16L 59/184; E04D 13/14; E04D 13/1473; E04D 13/1407; E04B 1/66
USPC ............................ 52/58, 60, 97, 244; 285/42
See application file for complete search history.

(56) References Cited

U.S. PATENT DOCUMENTS

| | | | | |
|---|---|---|---|---|
| 1,483,428 A | * | 2/1924 | Gaynor | F16L 5/027 126/317 |
| 1,689,952 A | * | 10/1928 | Lovejoy | F16L 5/00 126/317 |
| 2,620,208 A | * | 12/1952 | Patch | F16J 15/52 277/504 |
| 3,313,559 A | * | 4/1967 | Kifer | E04D 13/1476 285/43 |
| 3,602,530 A | * | 8/1971 | Elwart | E04D 13/1471 285/44 |
| 3,731,952 A | * | 5/1973 | Elwart | E04D 13/1476 285/44 |
| 4,526,407 A | * | 7/1985 | Kifer | E04D 13/1476 264/273 |

(Continued)

FOREIGN PATENT DOCUMENTS

| | | | | |
|---|---|---|---|---|
| EP | 2703703 A1 | * | 3/2014 | ............. F16L 5/025 |
| EP | 3135973 A1 | * | 3/2017 | ........... E04B 1/6813 |

*Primary Examiner* — Ryan D Kwiecinski
(74) *Attorney, Agent, or Firm* — Marc Delflache

(57) ABSTRACT

A cover for HVAC conduits and wiring exiting a structure is provided permitting a simplified solution to protect the line set in an aesthetically pleasing manner. A two-part face plate fits around the conduits and wiring. Each face plate includes a partial cone-shaped protruding member that circumscribes the conduits and wiring once installed. The cover also includes a sleeve that fits around the conduits, distal the cone-shaped protruding members in a tight-fitting manner providing further protection. The cover is easily removeable for a service technician to maintain and repair the conduits or wiring in future servicing.

20 Claims, 7 Drawing Sheets

(56) References Cited

U.S. PATENT DOCUMENTS

| | | | | |
|---|---|---|---|---|
| 5,526,619 | A * | 6/1996 | Vagedes | E03B 9/00 |
| | | | | 52/220.1 |
| 5,970,667 | A * | 10/1999 | Thaler | E04D 13/1407 |
| | | | | 52/60 |
| 6,161,589 | A * | 12/2000 | Bolotte | F16L 5/02 |
| | | | | 138/167 |
| 6,588,801 | B1 * | 7/2003 | Mayle | E04D 13/1407 |
| | | | | 285/43 |
| 6,691,473 | B1 * | 2/2004 | Mayle | E04D 13/1407 |
| | | | | 52/96 |
| 6,830,269 | B1 * | 12/2004 | Mayle | E04D 13/1407 |
| | | | | 285/43 |
| 6,892,499 | B1 * | 5/2005 | Mayle | E04D 13/1407 |
| | | | | 52/220.8 |
| 8,291,658 | B1 * | 10/2012 | Johnston | H02G 3/22 |
| | | | | 52/220.8 |
| 8,484,914 | B2 * | 7/2013 | Cline | E04D 13/1407 |
| | | | | 52/219 |
| 9,169,648 | B1 * | 10/2015 | Mills | E04D 13/1476 |
| 2002/0108316 | A1 * | 8/2002 | Miller | E04D 13/1476 |
| | | | | 52/302.1 |
| 2005/0204648 | A1 * | 9/2005 | Bibaud | E04D 13/1476 |
| | | | | 52/58 |
| 2007/0095396 | A1 * | 5/2007 | Ball | E04D 13/1407 |
| | | | | 137/295 |
| 2007/0101664 | A1 * | 5/2007 | Hoy | E04D 13/1407 |
| | | | | 52/198 |
| 2007/0272341 | A1 * | 11/2007 | Khan | E04D 13/1407 |
| | | | | 52/60 |
| 2017/0059061 | A1 * | 3/2017 | Haynes | E04B 1/6813 |

* cited by examiner

LINE SET COVER

CROSS REFERENCE TO RELATED APPLICATION

This application claims priority to U.S. Provisional Patent Application Ser. No. 63/276,270 which is hereby incorporated by reference and made a part hereof.

FIELD OF THE INVENTION

This invention relates to a cover for air conditioning ("HVAC") lines exiting a structure. More particularly, this invention relates to a protection cover for pipes, conduits and wires that exit a structure and extend from interior HVAC equipment to outdoor HVAC equipment.

BACKGROUND OF THE INVENTION

In closed HVAC systems insulated pipes and conduits run from an indoor HVAC area, such as a furnace and air handler in the attic or basement of a structure to an outdoor HVAC compressor, for example. As such, good insulation for optimal energy efficiency and also protecting the pipes and conduits from the outdoor environment (e.g., wind, ultraviolet exposure, rain, snow, bugs and so forth) is needed. If the pipes, conduits and wires (may be referred to collectively hereafter as "line set") are not adequately protected, particularly at the opening of the structure where the line set exits the structure, the end result may be a degradation in the efficiency of an HVAC system causing higher energy consumption as the equipment works harder and longer.

Many installers use non-uniform and substandard products and methods to seal the opening of the structure where the line set penetrates the structure. For example, soft foamed polymer fillers and adhesive tapes are sometimes used as insulation at the opening of the structure. Exposure to the outdoor environment often causes these types of penetration closures to fail. In addition, they are not aesthetically pleasing. Because of the different sizes of pipes, conduits and wiring and the inclusion in some multi-unit buildings of multiple line sets going through an opening, it is difficult for the installer to adequately seal each line set in a uniform and optimum manner. Doing so in an aesthetically pleasing manner is even more difficult. Therefore, there is a need for a line set cover at the exit point from the structure to accommodate single or multiple line sets in a quick, efficient, and aesthetically pleasing manner.

Prior attempts at uniform methods include recess boxing where the installer fabricates a metal box that is then embedded into the exterior wall. The line set is passed through the box and the installer then seals all around the box with a urethane foam or some other sealant. Other prior attempts at uniform efforts include single inlet roof flashings. These various methods have both aesthetic and efficacy issues. In addition, Airex has attempted to solve this problem with their Titan outlet product (http://www.airexmfg.com/titan/) and see U.S. Pat. Nos. 9,091,377; 9,523,200; 9,651,174; and 10,422,134. However, these products still do not accommodate the number and frequently odd angles of the line sets exiting the structure. Also, these products do not easily accommodate an existing HVAC outdoor unit with it existing line set, particularly if the installer needs to disconnect the pipes, conduits and wires and then reconnect after the prior art cover installed.

Accordingly, there is a need for a uniform apparatus and method to install a line set through an exterior penetration in a structure which is easy to install and protects both the line set and the interior of the building using the cover assembly. The cover assembly should be highly energy efficient (i.e., minimal air leakage) and should not depend on foam fillers, adhesives, or tape. The cover should easily accommodate unusual line set angles leaving the structure. Also, the cover should be flexible enough to aesthetically cover both single and multiple line sets and line sets of different shapes and sizes.

SUMMARY OF THE INVENTION

The present invention relates to an HVAC line set cover that fits over an opening which penetrates the outside wall of a structure and a portion of the line set adjacent to the outside wall penetration. The line set cover surrounds both the exposed line set and the exterior wall penetration to protect both that portion of the line set while also preventing the outside environment from having access to the interior of the structure through the outside wall penetration.

In at least one embodiment there is a cover adapted for mounting on the outside wall of a building to receive conduits, pipes, or wiring (e.g., line sets). The cover comprises a first face plate and a second face plate each having a partial hollow cone shaped protrusion. Each protrusion includes a proximal end at the face plate and a corresponding distal end away from its face plate. The two face plates are adapted to pivot about a point of rotation so that when the two face plates are joined, a completed hollow cone protrusion is formed. The cover also includes a sleeve membrane having a proximal end and a distal end and first and second edges, each edge extending between a proximal and distal end of the sleeve. A portion of the proximal end of the sleeve is fixed to the distal end of the first plate so that when the face plates are closed the sleeve may be wrapped around the conduits and wiring forming a closed cone shaped sleeve.

At least a portion of the proximal end of the sleeve is non-detachably attached to the distal end of the protrusion for the first face plate and a portion of the proximal end of the sleeve is adapted to be detachably attached to the distal end of the protrusion for the second face plate after the first face plate and second face plate have been pivoted back together and aligned In another embodiment the first face plate has a first gasket attached to an opposite side of the first face plate from the first protrusion and the second face plate has a second gasket attached to an opposite side of the second face plate from the second protrusion. These gaskets serve to help provide an air-tight seal of the cover against the opening in the structure where the line sets exit, thereby further protection.

The invention provides for the closure of the face plates around the line sets to be protected and the sleeve is then wrapped around the line sets to form a cone shaped protection defined by the hollow cone protrusion and the continuing sleeve. The sleeve includes securing means to keep the sleeve tight around the shielded line sets. If the cover needs to be removed for serving of the line sets, the clover is undone in the reverse manner.

Other and further objects, features, and advantages of the present invention will be apparent from the following description of the present invention, given for the purpose of disclosure, and taken in conjunction with the accompanying drawings. It is to be understood that the following detailed description and the accompanying drawings are not to be taken in a limiting sense.

DETAILED DESCRIPTION OF THE PREFERRED EMBODIMENTS

Figure 1:
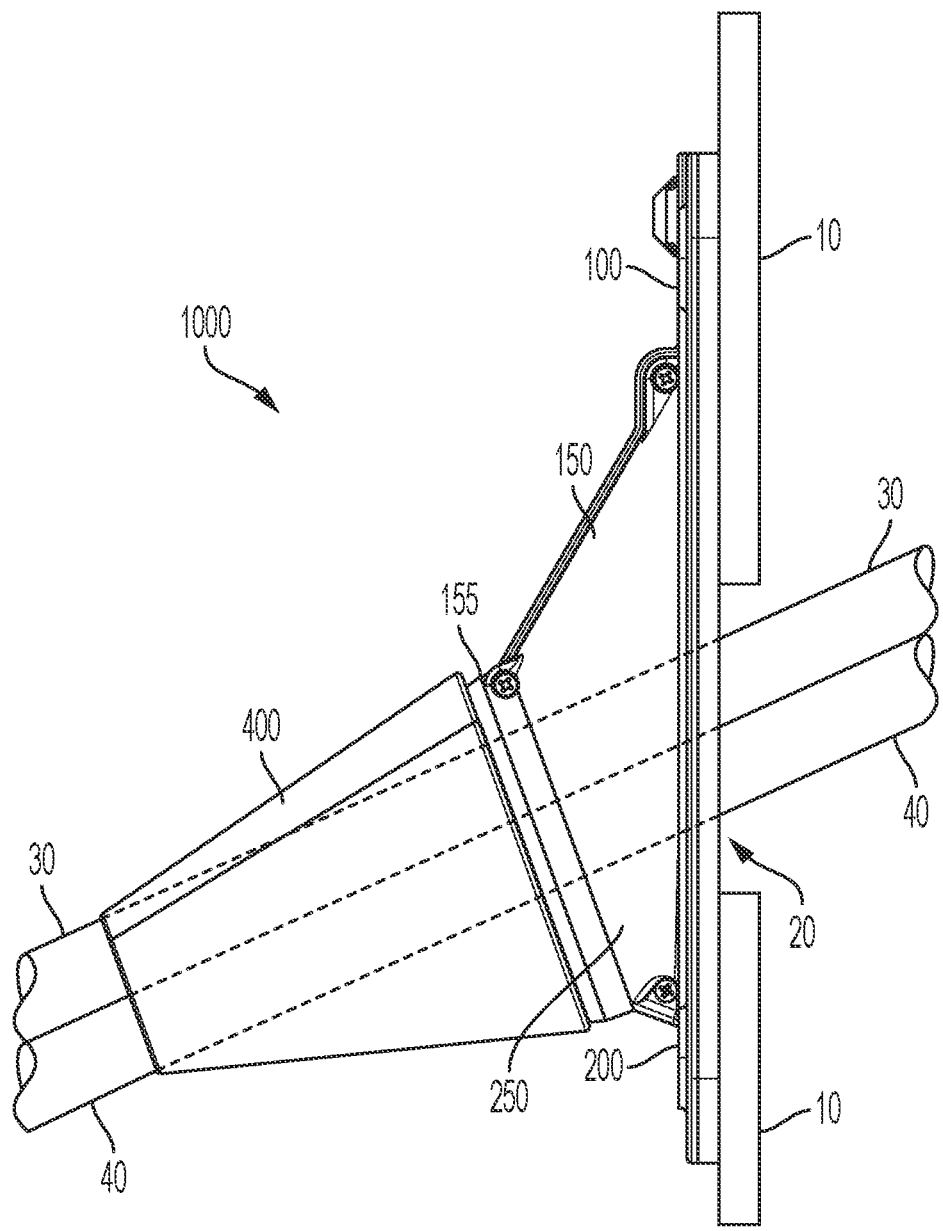
FIG. 1 is an elevation view of the present invention assembled.

The present disclosure describes an HVAC line set cover in accordance with certain embodiments of the present invention. Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale, and certain features and certain views of the figures may be shown exaggerated in scale or in schematic in the interest of clarity and conciseness.

As used herein and throughout various portions (and headings) of this patent application, the terms "disclosure", "present disclosure" and variations thereof are not intended to mean every possible embodiment encompassed by this disclosure or any particular claim. Thus, the subject matter of each such reference should not be considered as necessary for, or part of, every embodiment hereof or of any particular claim merely because of such reference.

The term "coupled" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function.

Also, the terms "including," "comprising," "including," and "having" are used herein and in the appended claims in an open-ended fashion, and thus should be interpreted to mean "including, but not limited to . . . " Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Preferred embodiments of the present disclosure offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features, and processes. Moreover, the present disclosure includes additional features, capabilities, functions, methods, uses, and applications that have not been specifically addressed herein but are, or will become, apparent from the description herein, the appended drawings, and claims.

The present technology now will be described more fully hereinafter with reference to the accompanying figures, in which some preferred embodiments of the invention are shown. This technology may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, line set cover 1000 is attached to wall 10 of a structure and surrounds opening 20 in wall 10 which may be referred to as a perforation in wall 10 as well. HVAC line sets 30 and 40 extend through opening 20 and line set cover 1000.

Figure 2:
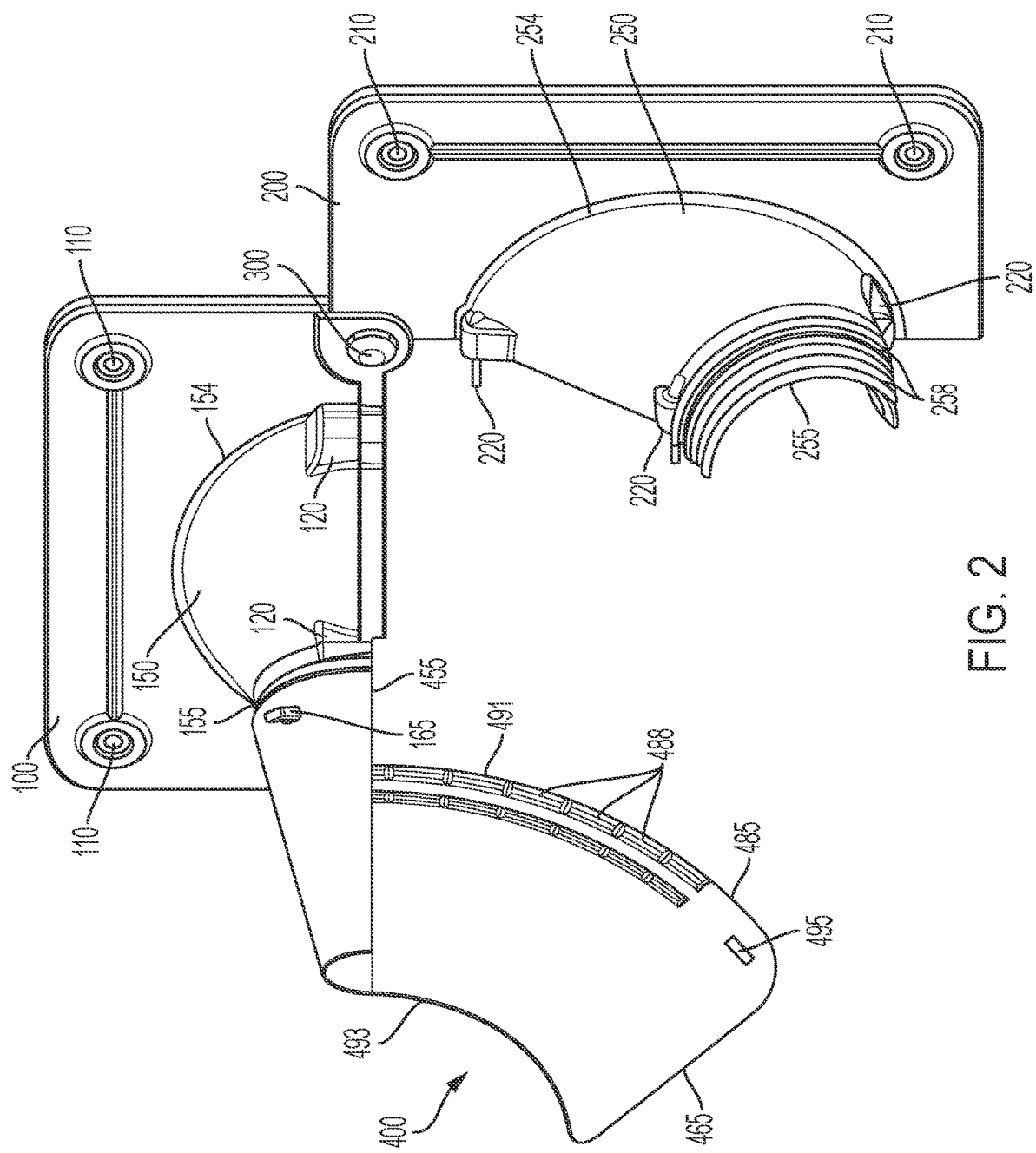
FIG. 2 is a frontal perspective view of the present invention during installation.

Referring now to FIGS. 1 and 2, line set cover 1000 is comprised of first face plate 100, second face plate 200, first hollow cone shaped protrusion 150, and hollow cone shaped protrusion 250. Protrusion 150 has a proximal end 154 and a distal end 155. Protrusion 250 has a proximal end 254 and a distal end 255. Line set cover 1000 further comprises a sleeve 400 having a proximal end 455 and a distal end 465. As used herein, a cone shall mean any shape that serves to provide an extension from the opening 20 in wall 10 and shall include other hollow shapes such as a cylinder, rectangle, a multi-sided prism, or a multi-sided pyramid frustrum.

Sleeve 400 includes a first edge 491 and a second edge 493. Once installed as described below, first edge 491 forms the proximal end 455 of sleeve 400 and second edge 493 forms the distal end 465 of sleeve 400. As shown in FIG. 2, proximal end 455 of sleeve 400 is adapted to be coupled to distal ends 155 and 255 of protrusions 150 and 250, respectively, as described further below.

Referring still to FIG. 2, line set cover 1000 is shown during the installation before first face plate 100 and second face plate are attached to wall 10 of the structure. As shown in detail in FIG. 2, plates 100 and 200 are rotatably pivoted apart about pivot point 300. In this installation configuration, first protrusion 150 of plate 100 and the second protrusion 250 of plate 200 are rotatably pivoted about pivot point 300 and are shown at about a 90-degree rotation relative to one another.

Figure 3:
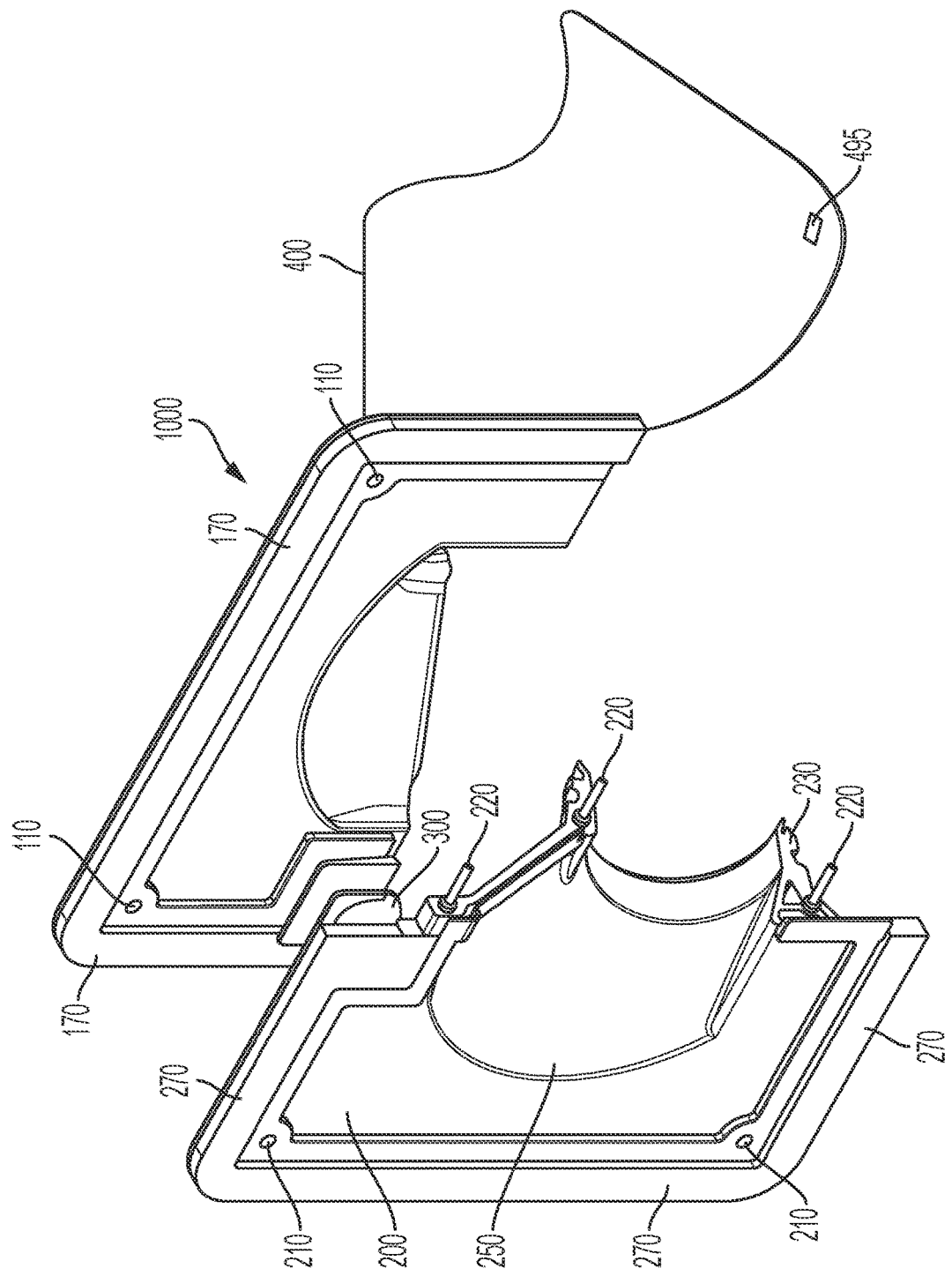
FIG. 3 is a rear view of the perspective view of the present invention as shown in FIG. 2.

Referring now to FIGS. 2 and 3, protrusion 150 extends outwardly from face plate 100 into the outside environment toward the outside HVAC air compressor. Similarly, protrusion 250 extends outwardly from face plate 200 into the outside environment toward the outside HVAC air compressor. In at least one embodiment, first face plate 100 and its protrusion 150 and second face plate 200 and its protrusion 250 may each be formed as a single integrated plastic unit using injection molding, for example. In one preferred embodiment the plastic is acrylonitrile styrene acrylate (ASA), and the thickness of the plastic is between 0.05 inches and 0.3 inches. Other potential plastics are ABS, PVC, polypropylene, and polycarbonate.

Referring still to FIGS. 2 and 3, a portion of distal end 155 of protrusion 150 is preferably non-detachably attached, or fixed, to a portion of sleeve 400 near edge 491 at the proximal end 455 of sleeve 400. Sleeve 400 can be made of any number of elastomers such as rubber, soft PVC and LDPE. In at least one embodiment, sleeve 400 is made of SANTOPRENE® available from Celanese Corporation. Sleeve 400 may also be manufactured by injection molding.

Figure 4:
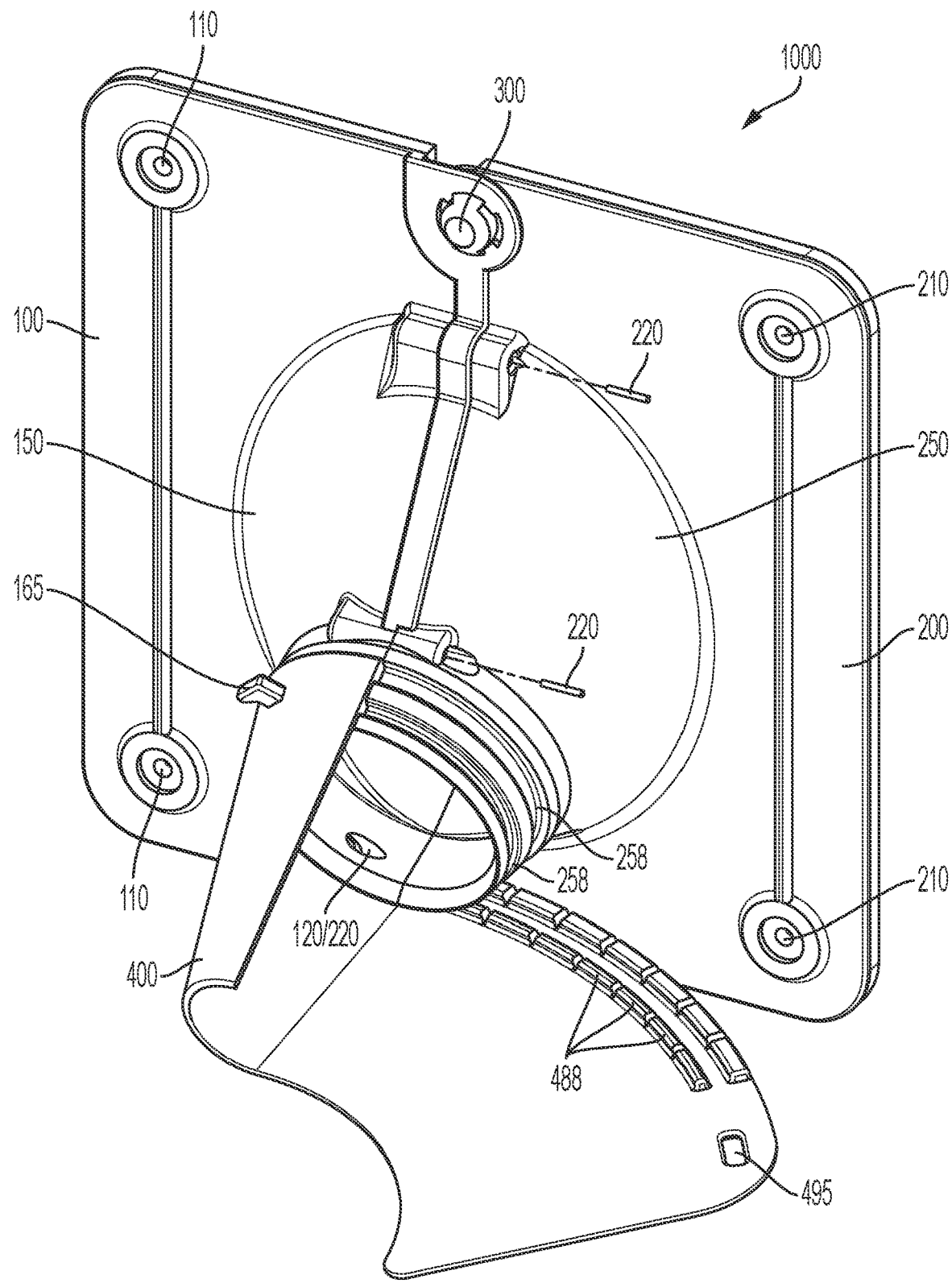
FIG. 4 is another frontal perspective view of the present invention during installation.

In at least one embodiment, at least a portion of edge 491 at proximal end 455 of sleeve 400 is attached to the distal end 155 of protrusion 150 by molding end 455 over distal end 155, known as over-molding. Sleeve 400 may be referred to as a sleeve membrane herein. Sleeve 400 may also be referred to as an elastomeric sleeve herein. As shown in FIG. 2, all of proximal end 485 formed along first edge 491 edge of sleeve 400 is not permanently attached to distal end 255 of protrusion 250. This allows second plate 200 to be rotated about point 300 and engage first protrusion 150. Then sleeve 400 may be wrapped around line sets 30/40 at edge 491 and attached to the distal end 255 of protrusion 250 as sleeve 400 as described in further detail below. Point 300 may be a manufactured part of the cover as shown in FIG. 4. It is shown as comprising a pin with half key that can be inserted in the opening of 300 on face plate 100 and then rotated to lock when the face plate 100/200 are aligned after placing over the line sets. Alternatively, a bolt, washer, nut type fastener (not shown) may pass through pivot point 300 and serve as the pivoting connection.

Sleeve 400 includes detachable securing means that allows proximal end 485 of sleeve 400 to be detachably attached to distal end 255 of protrusion 250 as sleeve 400 is wrapped around line sets 30/34. In at least one embodiment, proximal end 455 has channels 488 formed along first edge 490. Matching ribs 258 are formed on the distal end 255 of protrusion 250. Channels 488 and ribs 258 are sized so that channels 488 may be pressed over ribs 258 causing a friction fit. Additionally, protrusion 250 has guide pins 220 and protrusion 150 has guide cavities 120 so that when line set cover 1000 is placed around the line sets 30/40 and face plates 100 and 200 are pivoted about point 300 back into alignment, guide pins 220 fit into guide cavities 120 on protrusion 150 to ensure an accurate alignment.

Referring to FIG. 3, gasket 170 is attached to first plate 100 and second gasket 270 is attached to second plate 200. Gaskets 170 and 270 serve to provide an airtight fit for cover 1000 against wall 10. In at least one embodiment, gaskets 170 and 270 are made of PVC foam as commercially from Tianjin Dagu. First plate 100 includes apertures 110 and second plate 200 includes apertures 210. Apertures 110 and 210 accommodate fasteners such as screws, bolts, etc. to attach line set cover 1000 to wall 10 once the installation is completed. Referring still to FIG. 3, protrusion 250 includes brace member 230 which slopes downwardly to help shape protrusion 250 and direct any water than has leaked into the cover 1000 downwardly away from wall 10.

The installation of line set 1000 will now be described. First plate 100 is first rotated relative to second plate 200 about pivot point 300 as shown in FIG. 2. The installer then positions line set cover 1000 around line sets 30/40. The second plate is then rotated about point 300 and guide pins 220 enter and lock within guide cavities 120.

Referring now to FIG. 4, the next step is to wrap sleeve 400 around line sets 30/40. This is accomplished by attaching the beginning of channels 488 at the proximal end 455 of sleeve 400 onto ribs 258 formed on the distal end 255 of protrusion 250. Channels 488 are then pressure fitted completely around onto ribs 258. To ensure sleeve 400 is tightly attached around line sets 30/40 as shown in FIG. 1, distal end 465 of sleeve 400 includes opening 495.

As shown in FIGS. 2 and 4, a latch 165 is formed at the proximal end 455 of sleeve 400. The opening 495 and latch 165 are positioned and sized so that opening 495 it fits latch 165 and secures sleeve 400 tightly around line sets 30/40. Since sleeve 400 is preferable elastomeric and therefore stretchable, opening 495 can be stretched so that when opening 495 is placed over latch 165, sleeve 400 is in tension and will not become unattached from distal end 155 of protrusion 250. After tightly securing line sets 30/40 within sleeve 400, fasteners may be inserted through openings 110/210 securing line set cover 1000 to wall 10. When further repairs are required, this configuration also allows sleeve 400 to be detached from second protrusion 250 by pulling sleeve 400 consequently stretching opening 495 away from latch 165 and channels 488 may be peeled away from ribs 258.

Figure 5:
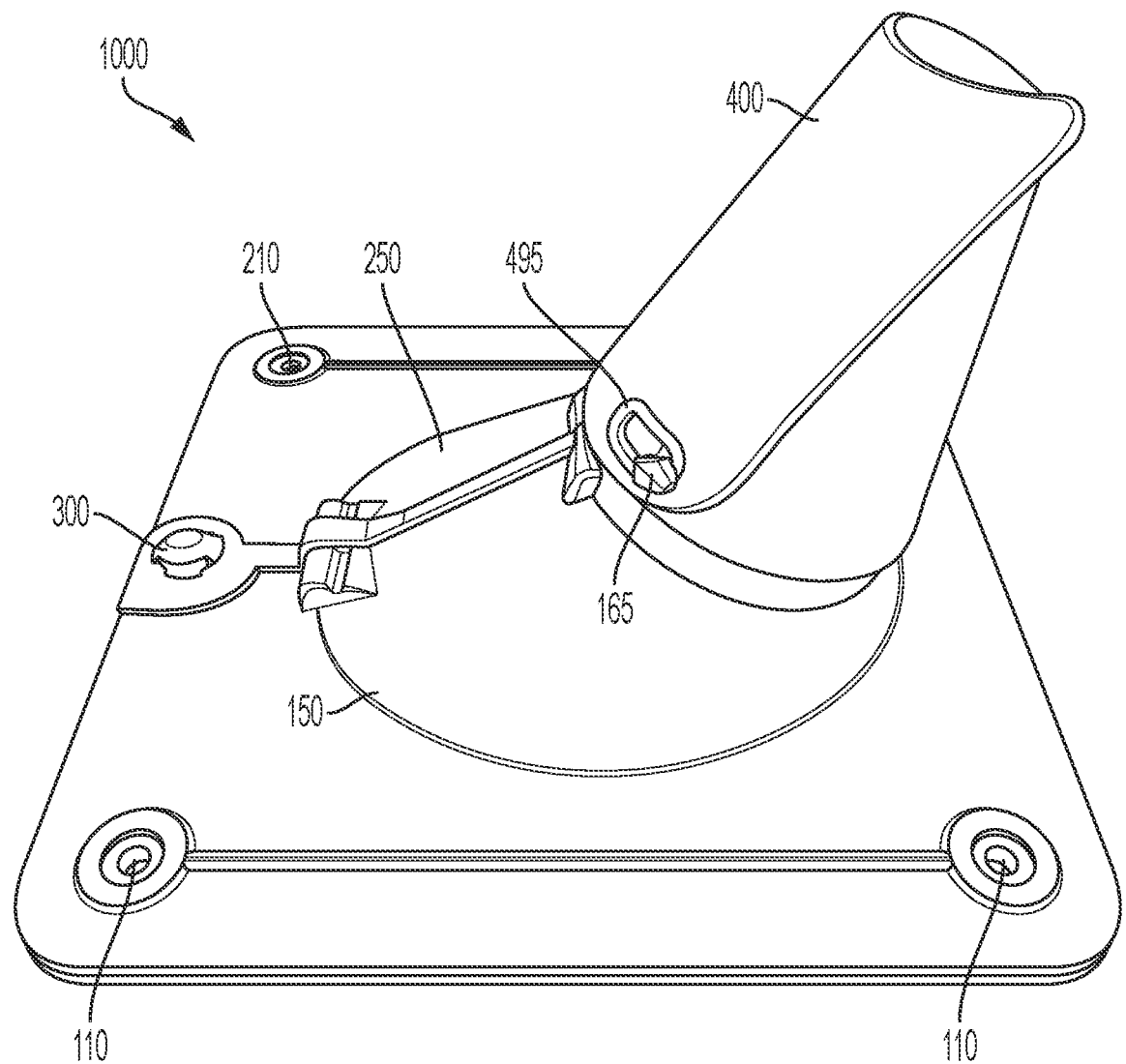
FIG. 5 is a perspective view of the present invention assembled.
Figure 6:
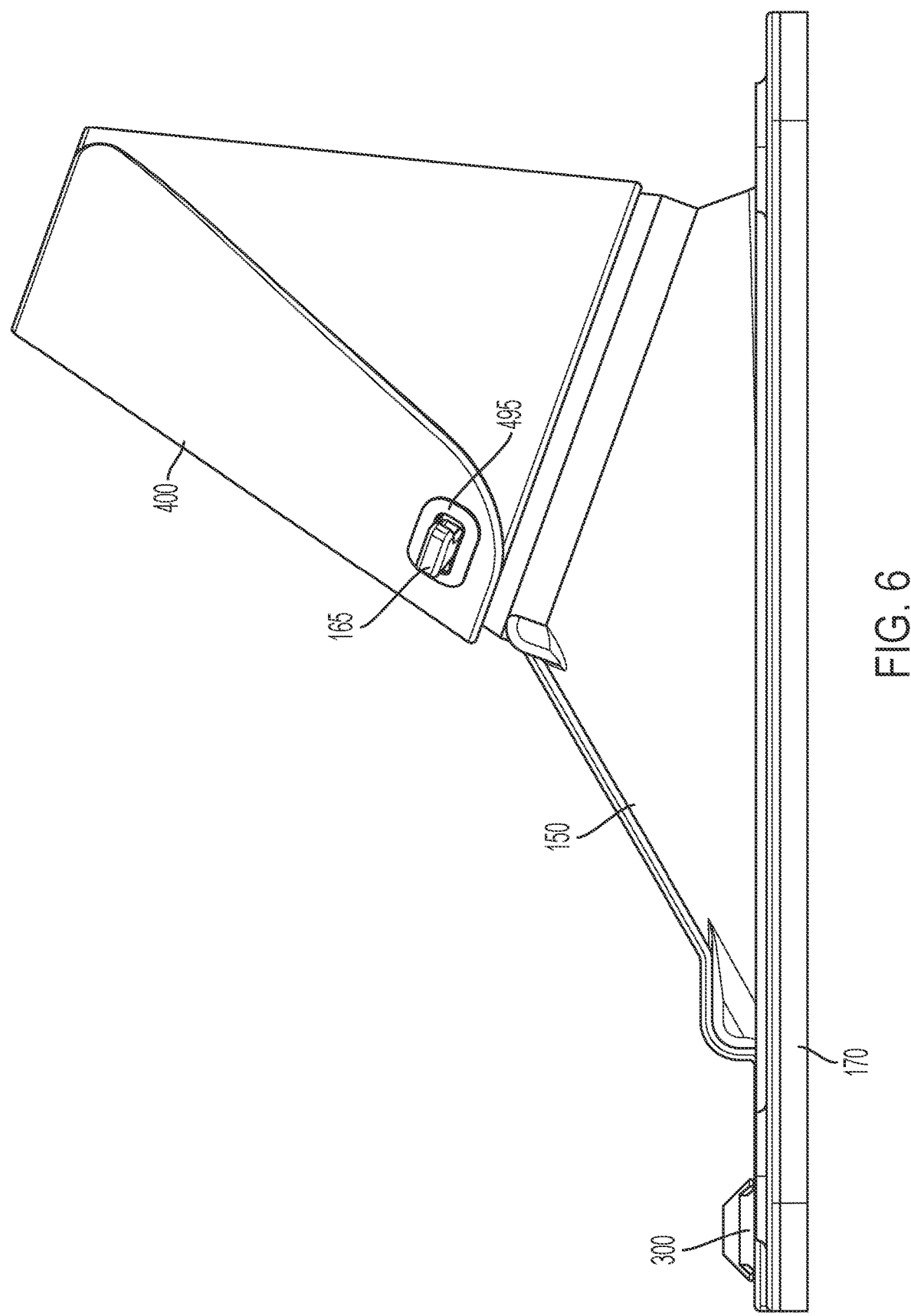
FIG. 6 is a side view of the present invention assembled.
Figure 7:
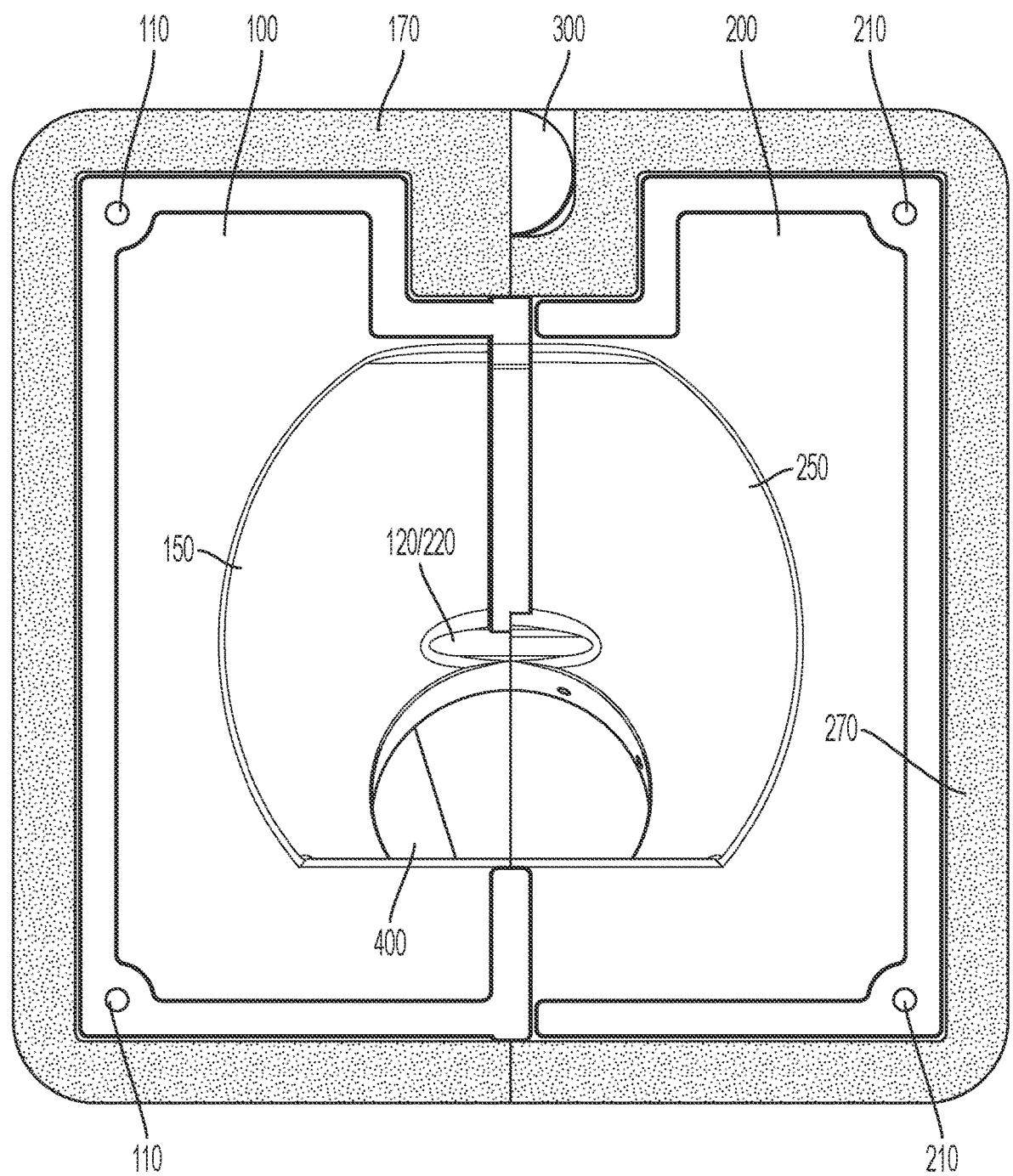
FIG. 7 is a rear view of the present invention assembled.

FIGS. 5 and 6 show an installed line set cover 1000 of the present invention. Face plates 100/200 are pivoted together and sleeve 400 is attached around line sets (not shown). Sleeve 400 may be cut to different lengths to accommodate different sizes and numbers of line sets. Sleeve 400 may also be tightened around line sets using various methods such as self-locking zip ties. To assist in cutting sleeve 400, sleeve 400 in at least one embodiment may include score lines at the distal end 465 so that the installer may cut the opening of the wrapped-around sleeve 400 to the desired fit for the specific application.

In this manner, line set cover 1000 of the present invention can be easily installed and removed when a service person needs access to line sets, such as copper tubing, located within sleeve 400 or protrusions 150/250 for maintenance and repair.

This disclosure results in improved HVAC efficiency and allows for simple, fast, and more efficient installations. It also permits the installer to aesthetically cover the exiting line set from a structure. Thus, operating cost and installation costs are lower than with prior art line set covers.

The invention in its broader aspects is not limited to the specific details of the preferred embodiments shown and described, and it will be appreciated that variations and modifications can be made without departing from the scope of the invention.

What is claimed is:

1. A cover adapted for mounting on the vertical wall of a structure to receive at least one pre-existing line set, said cover comprising:
   a first face plate having an opening;
   a first partial hollow cone shaped protrusion having a proximal and distal end, attached at its proximal end to the first face plate and extending from the opening of the first face plate outwardly away from the wall;
   a second face plate having an opening;
   a second partial hollow cone shaped protrusion having a proximal and distal end, attached at its proximal end to the second plate and extending from the opening of the second face plate outwardly away from the wall, wherein the first face plate is pivotally rotatable relative to the second face plate from a first position with the first and second cone shaped protrusions are separated to accommodate receiving the line set and a second position with the first and second cone shaped protrusions forming a hollow cone; and a flexible sleeve having a proximal end and a distal end, said proximal end of the sleeve comprising first and second portions so that the first portion of the proximal end of the sleeve is non-detachably attached to the distal end of the first partial hollow cone shaped protrusion and the second portion of the proximal end of the sleeve is detachably attachable to the distal end of the second partial hollow cone shaped protrusion so that when said face plates are in the second position said sleeve wraps around the line set forming a closed cone shaped sleeve.

2. The cover of claim 1 wherein the sleeve comprises:
a first generally longitudinal edge extending from the proximal end of the sleeve to the distal end of the sleeve; and
a second generally longitudinal edge extending from the proximal end of the sleeve to the distal end of the sleeve and being opposite the first edge.

3. The cover of claim 2 further comprises:
the sleeve includes a first securing means extending along the first edge from the proximal end to the distal end of the sleeve; and
the second partial hollow cone protrusion includes a second securing means at its distal end to engage the first securing means as the sleeve is wrapped around the distal end of the second partial hollow cone protrusion.

4. The cover of claim 3 wherein a portion of the first edge of the sleeve is fixedly attached at its proximal end to the distal end of the first partial hollow cone shaped protrusion.

5. The cover of claim 4 wherein the portion of the first edge of the sleeve is fixedly attached by molding said portion to the distal end of the first partial hollow cone shaped protrusion.

6. The cover of claim 3 wherein said first securing means comprises a channel and said second securing means comprises ribs so that the ribs engage said channel in a frictional fit as the sleeve is wrapped around the distal end of the second partial hollow cone protrusion.

7. The cover of claim 3 wherein the sleeve further comprises:
a protruding latch proximate the distal end of the first partial hollow cone shaped protrusion; and
an aperture proximate the distal end of the sleeve,
wherein following engagement of the first and second securing means, the latch being adapted to pass through the aperture so as to complete the wrap of the sleeve around the line set.

8. The cover of claim 1 wherein the first face plate includes a first gasket attached to an opposite side of the first face plate from the first partial hollow cone shaped protrusion and the second face plate includes a second gasket attached to an opposite side of the second face plate from the second partial hollow cone shaped protrusion.

9. The cover of claim 1 wherein the length of the sleeve from its proximal to distal ends being configured to accommodate one or more line sets.

10. A cover adapted for mounting on the vertical wall of a structure to receive at least one pre-existing line set, said cover comprising:
a first face plate having an opening;
a first partial hollow cone shaped protrusion having a proximal and distal end, attached at its proximal end to the first face plate and extending from the opening of the first face plate outwardly away from the wall;
a second face plate having an opening;
a second partial hollow cone shaped protrusion having a proximal and distal end, attached at its proximal end to the second plate and extending from the opening of the second face plate outwardly away from the wall, wherein the first face plate is pivotally rotatable relative to the second face plate from a first position with the first and second cone shaped protrusions are separated to accommodate receiving the pre-existing line set and a second position with the first and second cone shaped protrusions forming a hollow cone; and
sleeve membrane having a proximal end and a distal end, a first generally longitudinal edge extending from the proximal end of the sleeve membrane to the distal end of the sleeve membrane and a second generally longitudinal edge extending from the proximal end of the sleeve membrane to the distal end of the sleeve membrane and being opposite the first edge,
said sleeve membrane further comprises first securing means extending along the first edge from the proximal end to the distal end of the sleeve membrane; and
said second partial hollow cone protrusion comprises a second securing means at its distal end to engage the first securing means as the sleeve membrane is wrapped around the distal end of the second partial hollow cone protrusion.

11. The cover of claim 10 wherein a portion of the first edge of the sleeve membrane is fixedly attached at its proximal end to the distal end of the first partial hollow cone shaped protrusion.

12. The cover of claim 11 wherein the portion of the first edge of the sleeve membrane is fixedly attached by molding said portion the distal end of the first partial hollow cone shaped protrusion.

13. The cover of claim 10 wherein said first securing means comprises a channel and said second securing means comprises ribs so that the ribs engage said channel in a frictional fit as the sleeve membrane is wrapped around the distal end of the second partial hollow cone protrusion.

14. The cover of claim 10 wherein the sleeve membrane further comprises:
a protruding latch proximate the distal end of the first partial hollow cone shaped protrusion; and
an aperture proximate the distal end of the sleeve membrane,
wherein following engagement of the first and second securing means, the latch being adapted to pass through the aperture so as to complete the wrap of the sleeve membrane around the line set.

15. The cover of claim 10 wherein the length of the sleeve from its proximal to distal ends being configured to accommodate one or more line sets.

16. A cover adapted for mounting on the wall of a structure to receive at least one line set, said cover comprising:
a first face plate having an opening;
a first partial hollow cone shaped protrusion having a proximal and distal end, attached at its proximal end to the first face plate and extending from the opening of the first face plate outwardly away from the wall;
a second face plate having an opening;
a second partial hollow cone shaped protrusion having a proximal and distal end, attached at its proximal end to the second plate and extending from the opening of the second face plate outwardly away from the wall, wherein the first face plate is pivotally rotatable relative to the second face plate from a first position with the first and second cone shaped protrusions are separated to accommodate receiving the conduits and wiring and a second position with the first and second cone shaped protrusions forming a hollow cone;

a sleeve membrane having a proximal end and a distal end, a first edge extending from the proximal end of the sleeve membrane to the distal end of the sleeve membrane and a second edge extending from the proximal end of the sleeve membrane to the distal end of the sleeve membrane and being opposite the first edge;

said sleeve membrane further comprises:
- first securing means extending along the first edge from the proximal end to the distal end of the sleeve membrane,
- a protruding latch proximate the distal end of the first partial hollow cone shaped protrusion, and
- an aperture proximate the distal end of the sleeve membrane; and said second partial hollow cone protrusion comprises a second securing means at its distal end to engage the first securing means as the sleeve membrane is wrapped around the distal end of the second partial hollow cone protrusion.

17. The cover of claim 16 wherein a portion of the first edge of the sleeve membrane is fixedly attached by molding said portion to the distal end of the first partial hollow cone shaped protrusion.

18. The cover of claim 16 wherein said first securing means comprises a channel and said second securing means comprises ribs so that the ribs engage said channel in a frictional fit as the sleeve membrane is wrapped around the distal end of the second partial hollow cone protrusion.

19. The cover of claim 16 wherein the first face plate includes a first gasket attached to an opposite side of the first face plate from the first partial hollow cone shaped protrusion and the second face plate includes a second gasket attached to an opposite side of the second face plate from the second partial hollow cone shaped protrusion.

20. The cover of claim 16 wherein the length of the sleeve from its proximal to distal ends being configured to accommodate one or more line sets.

* * * * *